United States Patent
Pallett et al.

(10) Patent No.: US 7,225,782 B2
(45) Date of Patent: Jun. 5, 2007

(54) SYSTEM AND METHOD TO CONTROL TRANSITIONS IN THE NUMBER OF CYLINDERS IN A HYBRID VEHICLE

(75) Inventors: Tobias Pallett, Farmington Hills, MI (US); James Kerns, Trenton, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/073,320

(22) Filed: Mar. 3, 2005

(65) Prior Publication Data

US 2006/0196463 A1 Sep. 7, 2006

(51) Int. Cl.
*F02B 75/06* (2006.01)
*F02D 17/02* (2006.01)

(52) U.S. Cl. ............................. 123/192.1; 123/198 F
(58) Field of Classification Search ............ 123/192.1, 123/198 F, 481
See application file for complete search history.

(56) References Cited

U.S. PATENT DOCUMENTS

| | | | |
|---|---|---|---|
| 5,105,776 A | 4/1992 | Tsuchiya et al. | |
| 5,374,224 A | 12/1994 | Huffmaster et al. | |
| 6,487,998 B1 * | 12/2002 | Masberg et al. | 123/192.1 |
| 6,687,603 B2 | 2/2004 | Wakashiro et al. | |
| 6,691,807 B1 | 2/2004 | Bhavsar et al. | |
| 6,886,524 B2 * | 5/2005 | Hanada et al. | 123/198 F |
| 2004/0026928 A1 | 2/2004 | Wakashiro et al. | |

FOREIGN PATENT DOCUMENTS

EP 1426590 9/2004

* cited by examiner

*Primary Examiner*—Stephen K. Cronin
*Assistant Examiner*—Hyder Ali
(74) *Attorney, Agent, or Firm*—Allan J. Lippa; Alleman Hall McCoy Russell & Tuttle, LLP

(57) ABSTRACT

A vehicle system is disclosed. The system include a engine capable of disabling and enabling at least one cylinder; a motor coupled to said engine capable of absorbing torque and providing torque; and a controller for disabling and enabling said at least one cylinder, and during at least one of disabling and enabling, varying torque of said motor to compensate for transient changes in engine output torque caused by said one of disabling and enabling.

22 Claims, 6 Drawing Sheets

US 7,225,782 B2

SYSTEM AND METHOD TO CONTROL TRANSITIONS IN THE NUMBER OF CYLINDERS IN A HYBRID VEHICLE

FIELD

The present application relates to variable displacement engines coupled in hybrid powetrains of vehicles.

BACKGROUND AND SUMMARY

Variable displacement engine have been used where one or more cylinder is deactivated (e.g., by closing intake and exhaust valves). In this way, increased fuel economy can be obtained during engine operating conditions that do not require full cylinder operation.

Vehicle system with variable displacement capabilities have also been described having hybrid powertrains. For example, US 2004/0035113 describes an approach where cylinder deactivation operation can be extended by providing additional torque from an electric motor. Further, activation/deactivation transitions are described using changes in throttle position with motor assist require before, during, and after the transition.

The inventors herein have recognized a disadvantage with such an approach. In particular, US 2004/0035113 generally requires consistent application of torque from the motor during cylinder deactivation conditions; however, this can continually drain the battery, especially during vehicle towing conditions or during long vehicle climbs. Furthermore, the inventors herein have also recognized that the transitions according to US 2004/0035113 may also result in degraded vehicle feel since a substantially constant motor torque is used, relying on rapid throttle changes to handle the torque disturbance. Specifically, even rapid throttle changes may be inadequate to provide acceptable vibration and drive feel during the transition.

In one example, at least some of the above disadvantages may be overcome by a vehicle system, comprising: a engine capable of disabling and enabling at least one cylinder; a motor coupled to said engine capable of absorbing torque and providing torque; and a controller for disabling and enabling said at least one cylinder, and during at least one of disabling and enabling, varying torque of said motor to compensate for transient changes in engine output torque caused by said one of disabling and enabling.

In this way, it may be possible to provide improved torque control during variation in the number of cylinders carrying out combustion. Further, such transitions may be performed with less energy loss due to spark retard. Further still, such transitions may be performed to increase stored energy. Finally, such transitions may be performed based on battery status to provide improved hybrid vehicle performance.

Note that there may be various approaches to disabling cylinders, including disabling intake and exhaust valves, disabling fuel injection (without disabling valves), or others.

DETAILED DESCRIPTION

Figure 1:
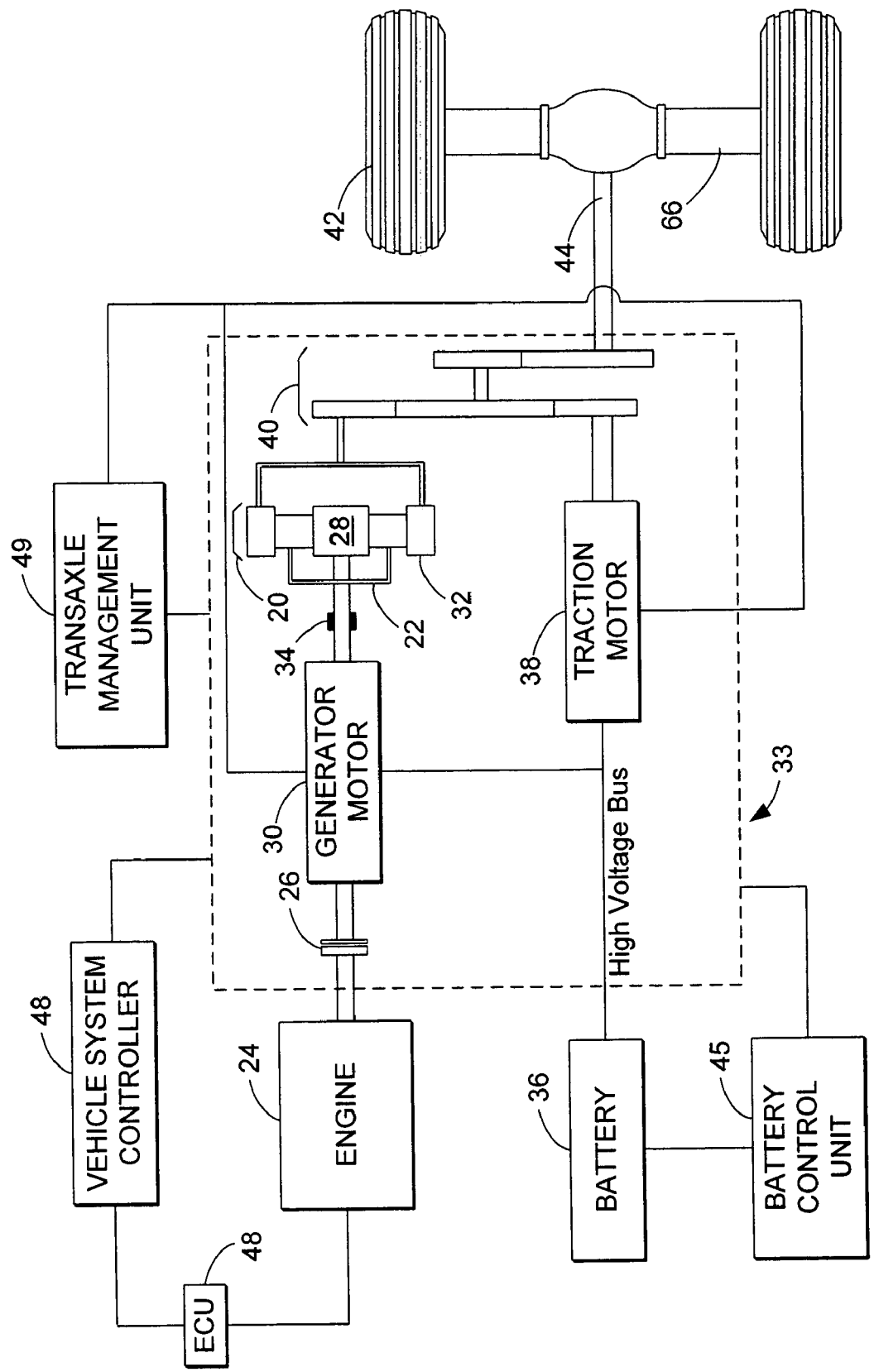
FIG. 1 is a schematic diagram of an engine in an example hybrid powertrain.

The present disclosure relates to electric vehicles and, more particularly, hybrid electric vehicles (HEVs). FIG. 1 demonstrates just one possible configuration, specifically a parallel/series hybrid electric vehicle (split) configuration.

In an HEV, a planetary gear set 20 mechanically couples a carrier gear 22 to an engine 24 via a one way clutch 26. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

The planetary gear set 20, splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

A vehicle system controller (VSC) 46 controls many components in this HEV configuration by connecting to each component's controller. An engine control unit (ECU) 48 connects to the Engine 24 via a hardwire interface (see further details in FIG. 2). In one example, the ECU 48 and VSC 46 can be placed in the same unit, but are actually separate controllers. Alternatively, they may be the same controller, or placed in separate units. The VSC 46 communicates with the ECU 48, as well as a battery control unit (BCU) 45 and a transaxle management unit (TMU) 49 through a communication network such as a controller area network (CAN) 33. The BCU 45 connects to the battery 36 via a hardware interface. The TMU 52 controls the generator motor 30 and the traction motor 38 via a hardwire interface. The control units 46, 48, 45 and 49, and controller area network 33 can include one or more microprocessors, computers, or central processing units; one or more computer readable storage devices; one or more memory management units; and one or more input/output devices for communicating with various sensors, actuators and control circuits.

Figure 2:
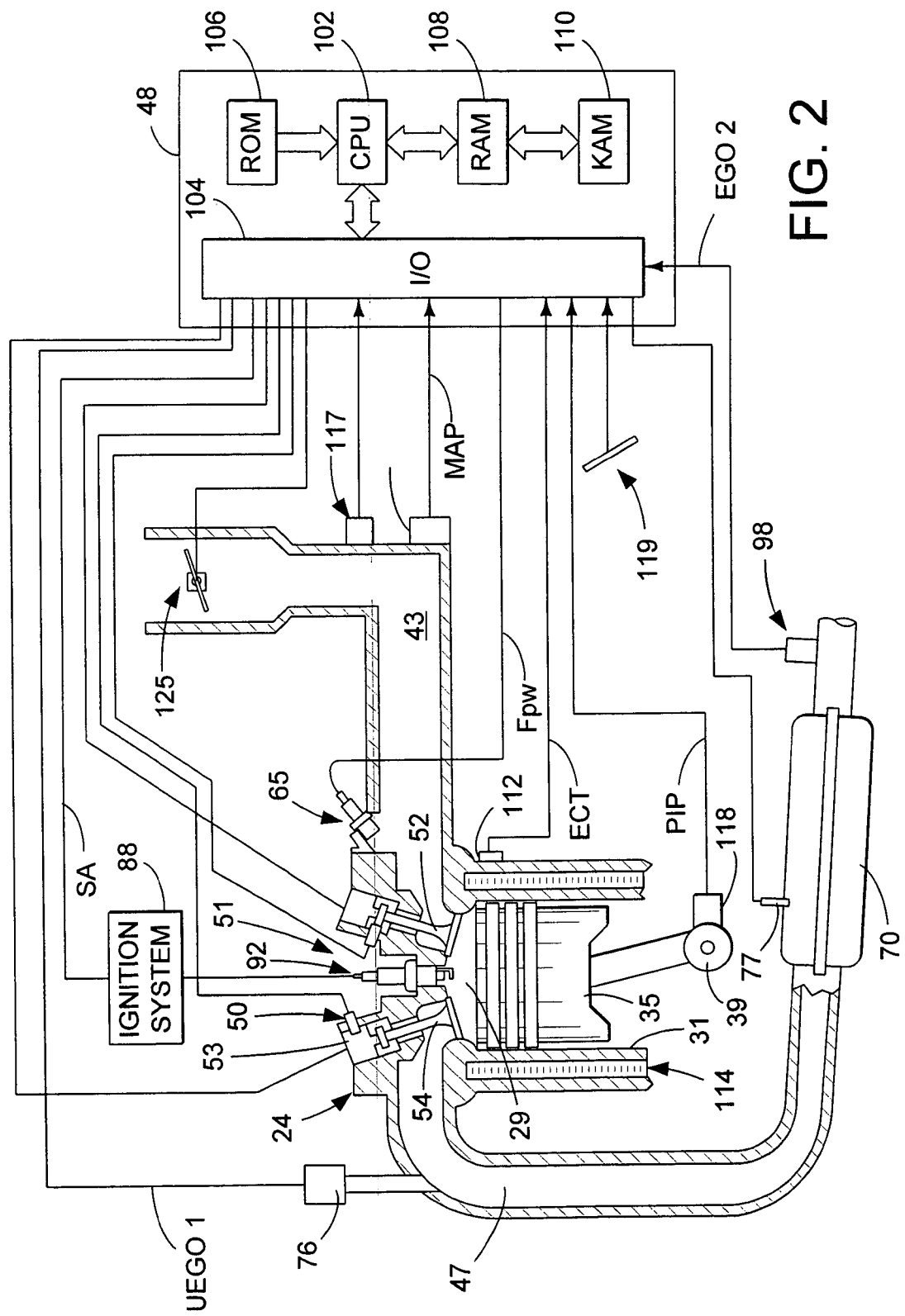
FIG. 2 is a schematic diagram of an engine, intake system, and exhaust system.

FIG. 2 shows an example engine and exhaust system that may be used as engine 24. Internal combustion engine 24, comprising a plurality of cylinders, one cylinder of which is shown in FIG. 2, is controlled by electronic engine controller 48. Engine 24 includes combustion chamber 29 and cylinder walls 31 with piston 35 positioned therein and connected to crankshaft 39. Combustion chamber 29 is shown communicating with intake manifold 43 and exhaust manifold 47 via respective intake valve 52 an exhaust valve 54. Each intake and exhaust valve is operated by an electromechanically controlled valve coil and armature assembly 53. Armature temperature is determined by temperature sensor 51. Valve position is determined by position sensor 50. In an alternative example, each of valves actuators for valves 52 and 54 has a position sensor and a temperature sensor. In an alternative embodiment, cam actuated valves may be used with or without variable cam timing or variable valve lift.

Intake manifold 43 is also shown having fuel injector 65 coupled thereto for delivering liquid fuel in proportion to the pulse width of signal FPW from controller 48. Fuel is delivered to fuel injector 65 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 43 is shown communicating with optional electronic throttle 125.

Distributorless ignition system 88 provides ignition spark to combustion chamber 30 via spark plug 92 in response to controller 48. Universal Exhaust Gas Oxygen (UEGO) sensor 76 is shown coupled to exhaust manifold 47 upstream of catalytic converter 70. Alternatively, a two-state exhaust gas oxygen sensor may be substituted for UEGO sensor 76. Two-state exhaust gas oxygen sensor 98 is shown coupled to exhaust manifold 47 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof. Converter 70 can include multiple catalyst bricks, in one example. In another example, multiple emission control devices, each with multiple bricks, can be used. Converter 70 can be a three-way type catalyst in one example.

Controller 48 is shown in FIG. 2 as a conventional microcomputer including: microprocessor unit 102, input/output ports 104, and read-only memory 106, random access memory 108, 110 keep alive memory, and a conventional data bus. Controller 48 is shown receiving various signals from sensors coupled to engine 24, in addition to those signals previously discussed, including: engine coolant temperature (ECT) from temperature sensor 112 coupled to cooling sleeve 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In one aspect of the present description, engine position sensor 118 produces a predetermined number of equally spaced pulses every revolution of the crankshaft from which engine speed (RPM) can be determined.

In an alternative embodiment, a direct injection type engine can be used where injector 66 is positioned in combustion chamber 29, either in the cylinder head similar to spark plug 92, or on the side of the combustion chamber.

In one example, engine 24 can operate in a variable displacement mode where one or more cylinder operates with deactivated valves. For example, both the intake and exhaust valves can be held closed for one or more cycles of the cylinder or engine. In the example of cam actuated valves, a deactivation mechanism may be used which is electro-hydraulically controlled. For example, deactivators may be used in lifters or in portions of an overhead cam assembly. Alternatively, cylinder deactivation may include continuing valve operation and disabling fuel injection (e.g., fuel-cut operation).

As noted above, any number of different engine types may be used. While the description below relates to a V-8 engine capable of deactivating four cylinders (e.g., 4 cylinder valve-deactivation mode and 8 cylinder non-valve-deactivation mode), various other engine configurations may be used. The examples described herein equally apply to an engine with 4, 6, 10, 12 or other number of cylinders. Additionally, these examples can easily be extended to systems where multiple valve deactivation modes are available (i.e. 2, 4, or 6 cylinder operation for a V8 engine).

Figure 3:
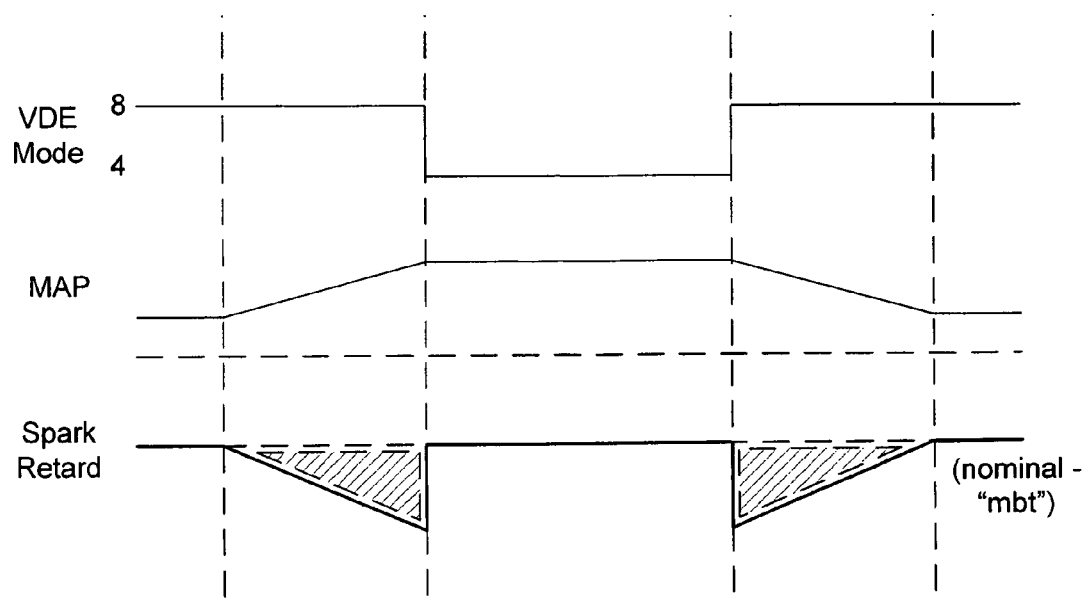
FIGS. 3–6 are graphs showing example operation according to various example embodiments.

One approach to managing mode transitions utilizes coordination of ignition timing retard and throttle position. When running in valve deactivation mode, the manifold pressure is increased to maintain substantially equivalent torque. Since throttle position may not immediately change airflow into the VDE engine (due to throttle response lag and manifold filling), spark retard may be used to reduce engine torque while increasing manifold pressure to the new desired set point (see FIG. 3). While spark is one variable that may be used to reduce engine output of oncoming (or off going) cylinders, any combination of spark, enleanment, or injector cutout could be used to reduce torque during this transition. As can be seen from FIG. 3, such an approach may result in a energy loss (and thereby degrade fuel economy) during these transitions. In other words, spark retard is able to rapidly reduce torque, but results in inefficient use of the injected fuel. Note that FIG. 3 shows spark retard/advance from a nominal value, which may be maximum torque for best torque (MBT).

Another approach to managing mode transitions incorporates adjustment a secondary torque source, such as a motor used in a hybrid powertrain. Various other types of secondary torque sources may be used, such as, for example, a starter-alternator or transaxle motor. In this example, the secondary torque source provides another option for managing engine torque during VDE transitions. Torque adjustments (to reduce or increase torque) can be achieved via the secondary torque source instead of, or in addition to, spark retard. In this way, numerous options are available to manage the transition in the number of active cylinders. These include:

Absorbing torque in the secondary torque source before deactivating activated cylinders;
   Absorbing torque in the secondary torque source after activating deactivated cylinders;
   Providing torque in the secondary torque source after deactivating activated cylinders;
   Providing torque in the secondary torque source before activating deactivated cylinders; and/or
   Combinations thereof, including varying the levels of absorbing/providing torque during any one transition (or between multiple transitions), such as based on battery state of charge and/or other operating conditions.

By using any one or more of the above options, it can be possible to manage energy flow while providing the desired engine torque control during VDE mode transitions.

Figure 4:
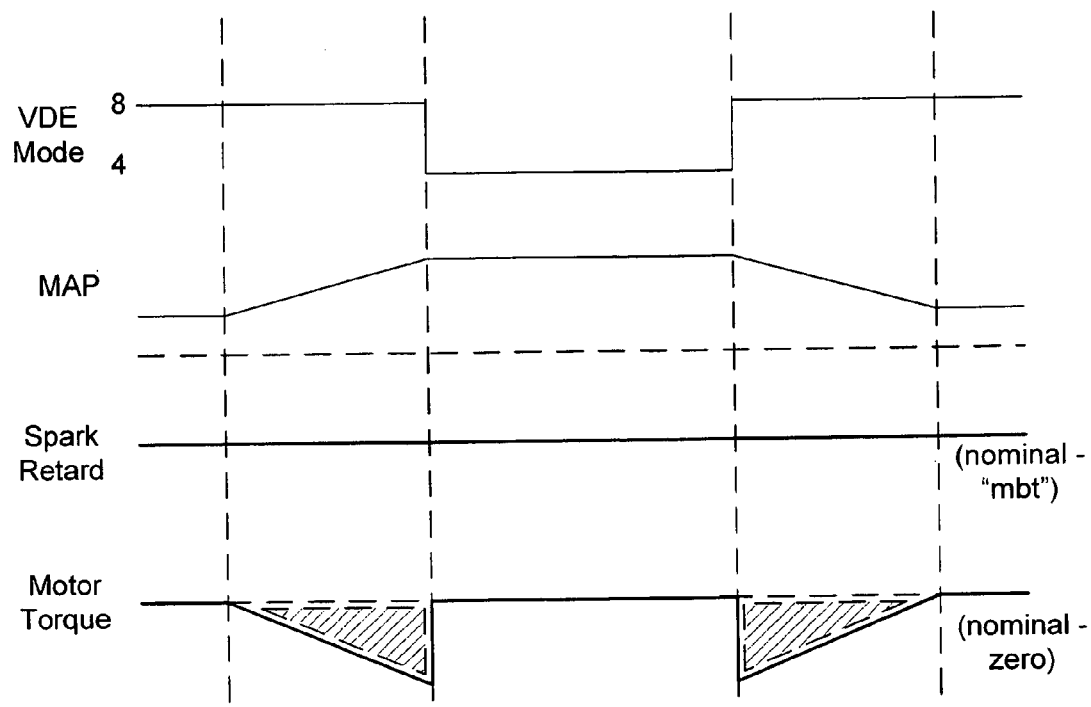
Figure 5:
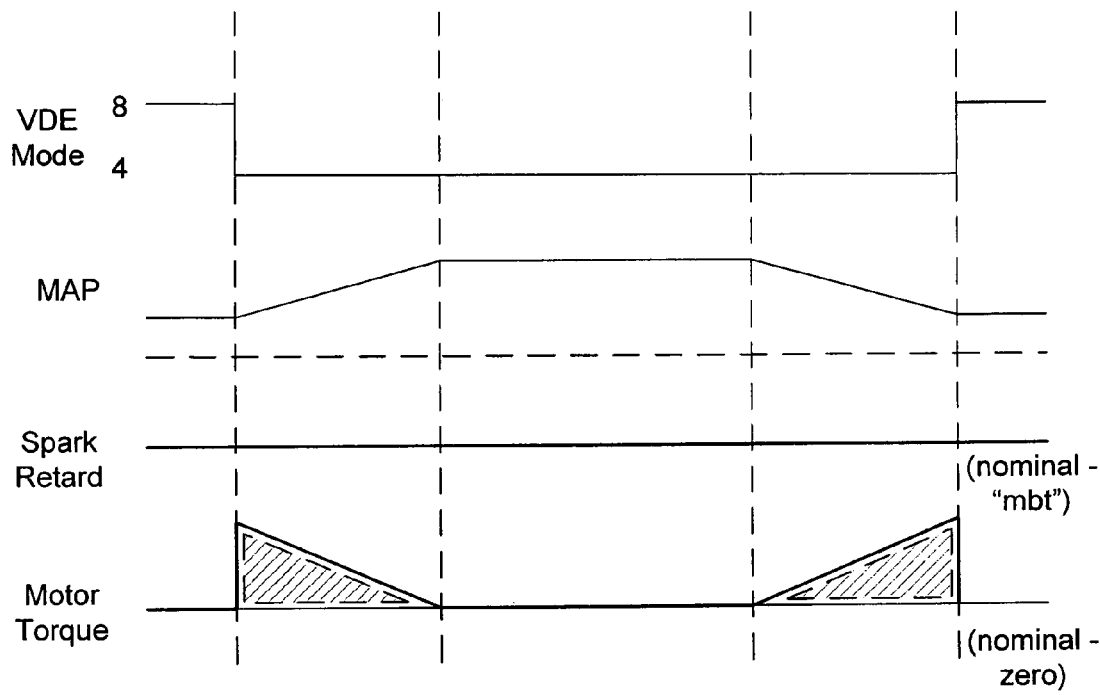
Figure 6:
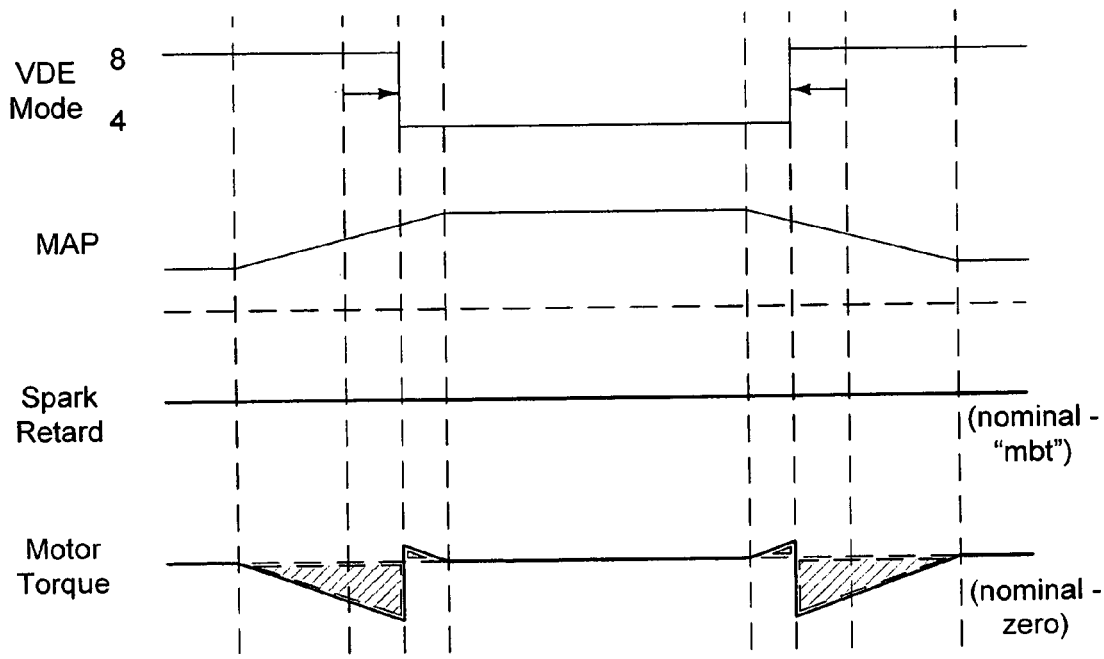

Referring now to FIGS. 4–6, various examples are shown illustrating different mode transition control strategies (4->8 and 8->4 transitions with energy recovery/negative secondary torque and energy usage/positive secondary torque). In these examples, an electric motor is given as an example secondary torque source. FIG. 4 shows an example in which energy is absorbed through the electric motor during both the activation and deactivation of cylinders. The absorbed energy may then be available to be stored, such as in a battery. In particular, FIG. 4 shows that the increased engine output (from increasing manifold pressure via, e.g., adjustment of throttle position) during 8-cylinder operation can be used absorbed by the motor/battery electrical system. Then, when disabling cylinders (and thus removing the increased engine output), the motor/battery system can likewise be adjusted to reduce its energy storage. The enablement transition follows a similar approach in which energy is stored via the motor/battery system during the decrease in manifold pressure. In this way, engine torque during the transition can be controlled. While not shown in this example, further adjustments to ignition timing may be used, if desired.

While the approach of FIG. 4 provides efficient use of the temporary engine output increase, additional factors can determine the amount of motor torque absorption/storage, such as, for example, battery state of charge (SOC). For example, energy absorption via the motor may be advantageous during low battery state of charge conditions. Also, as noted above, ignition timing adjustments may be used, some combination of negative motor torque and spark retard may be used, or positive motor torque may be used (see below), or combinations thereof.

Referring now to FIG. 5, an example transition is shown in which energy may be provided through the electric motor during both the activation and deactivation of cylinders. In this example, the torque deficiency that may otherwise be present due to the increasing (or decreasing) of manifold pressure is made up through the motor. In other words, FIG. 5 shows that the engine output torque deficiency during 4-cylinder operation can be compensated for by the motor/battery electrical system. In this way, engine torque during the transition can be controlled. Such an approach may be used when there is a surplus of charge (e.g., high battery SOC), or when there may be motor torque limitations (e.g. maximum negative torque limits or dynamic response limits). Also, while not shown in this example, further adjustments to ignition timing may be used, if desired. Such an approach may be particularly useful in a starter-alternator/VDE combination where the starter-alternator may have less torque capability and less energy storage capability within the battery.

Note that other parameters may also influence whether the motor is used to supply or absorb energy, whether ignition timing retard is used, or whether to use the motor at all, or whether to select from combinations thereof. For example, ignition timing retard may affect catalyst temperature and emissions, and thus such factors may be used to select the transition compensation strategy. For example, in FIG. 6, the motor both supplies and absorbs torque during the transition. The amount of supply/absorption can be adjusted (based on operating conditions such as battery state of charge, motor torque capability, desired engine torque, etc.), or can be selected to be energy neutral. An energy neutral transition can be one in which the amount of energy supplied by the motor approximately equals the amount of energy stored. Alternatively, by changing the actual VDE transition point relative to the transition of the manifold absolute pressure (MAP) from one mode to the other, it can be possible to adjust the net energy flow from full absorption, to neutral, to full torque supply.

Note that in the preceding cases, for illustrative purposes, the nominal secondary engine torque condition is shown to be zero. However, the approaches can be applied to other conditions, such as non-zero nominal torque (e.g., the case both the VDE and transaxle motor produce positive torque). In such a case, the motor may provide less positive torque (less energy) during a transition rather than actually recovering energy as shown in the above examples.

Figure 7:
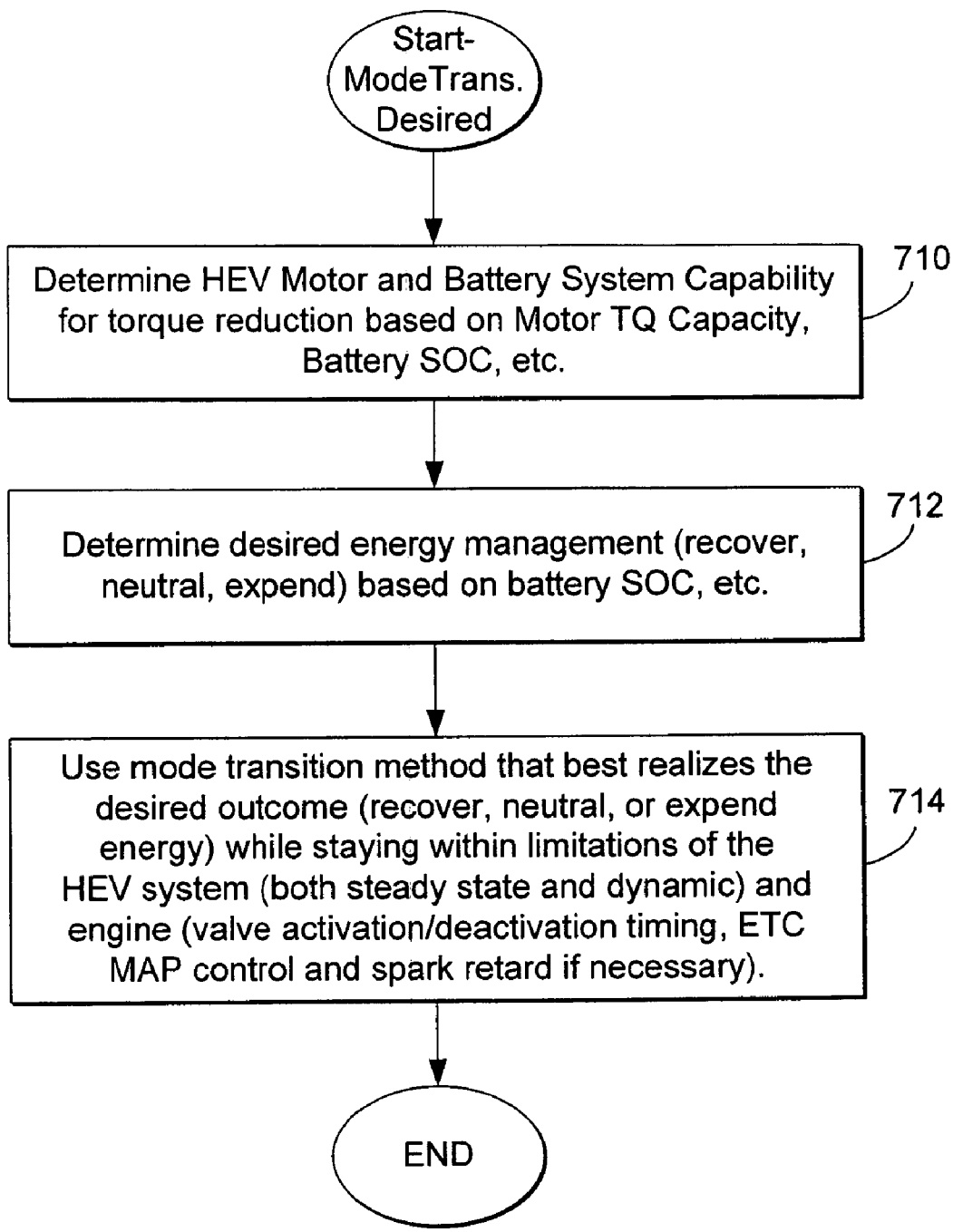
FIGS. 7–8 are high level flowcharts showing an example embodiment of operation.
Figure 8:
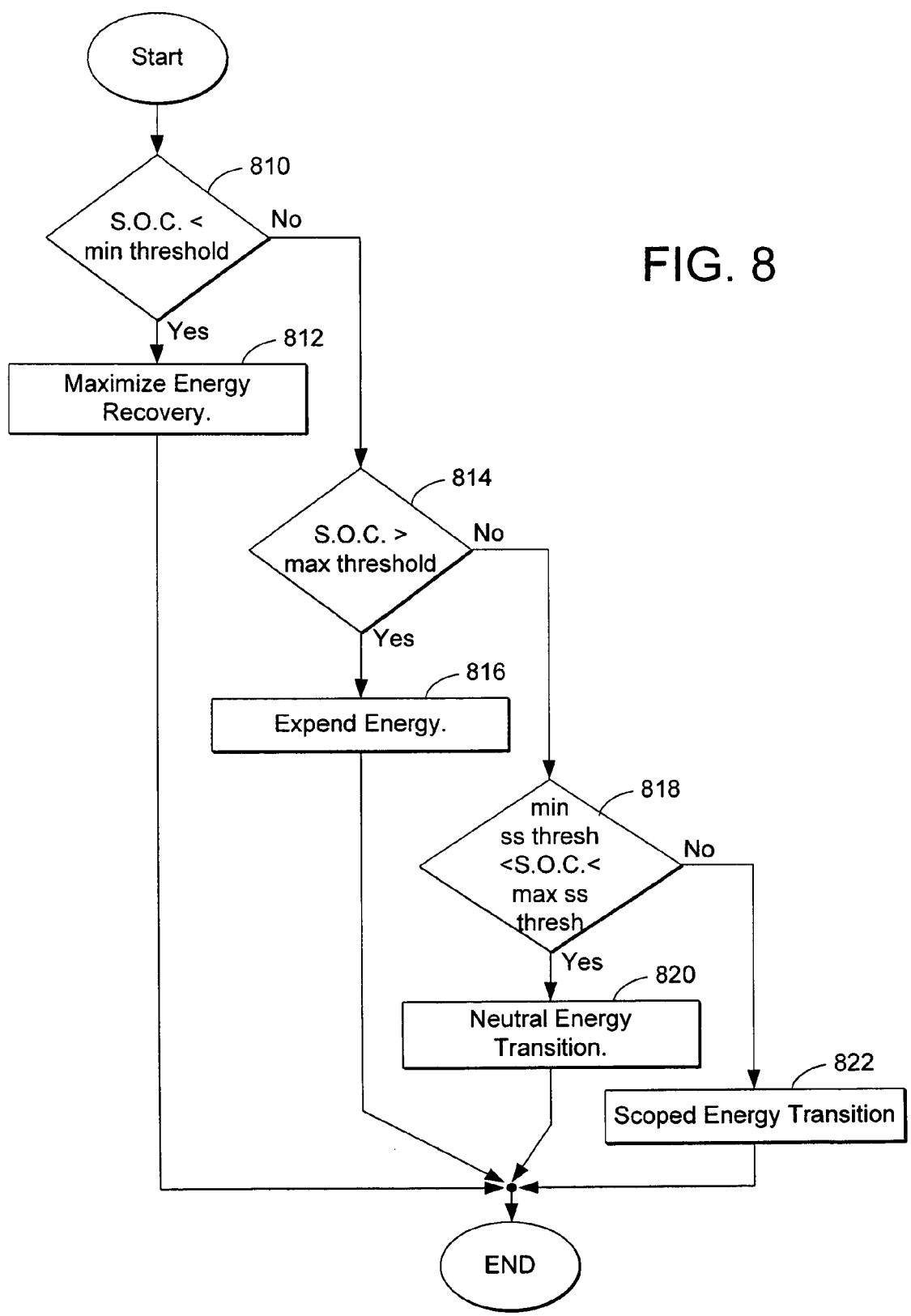

Referring now to FIGS. 7–8, example routines are described for controlling VDE transitions. As shown above, several different examples are described for maintaining the desired engine torque during a VDE transition (4->8 or 8->4). As described below, the approach used to maintain torque during the transition can vary depending on battery SOC, secondary motor torque capacity, secondary motor dynamic torque response, and/or other relevant system conditions.

The flow chart of FIG. 7 begins with an indication from other portions of a powertrain control strategy that a VDE mode transition is desired. The first step (710) is to determine the effective constraints of the HEV motor and battery to absorb or add torque to the system. The next step (712) is to select a combination of ignition timing retard, throttle adjustment (before, after, and/or during the transition), and motor torque adjustment (absorption, supply, or combinations thereof) (before, after, and/or during the transition). For example, step 712 may determine whether energy should be stored, spent, or maintained substantially neutral. This determination can be based on conditions such as battery SOC. However, conditions such as a high battery SOC may result in the selection of still another mode (see below). In one approach, energy recovery is nominally selected, except when battery SOC is above a threshold or the system is unable to absorb the required energy. In another approach, the routine has a preset map of the type of compensation to use depending on engine speed/load/torque conditions to minimize engine torque disturbances irrespective of engine storage/release.

Continuing with FIG. 7, in step 714 the mode transition method determined in step 712 is activated and the desired torque contribution from the HEV motor and engine (valve activation/deactivation timing, ETC MAP control, and/or spark retard, if necessary) is determined. Further, additional adjustments may be added to account for various system limitations (both steady state and dynamic).

Referring now to FIG. 8, a routine is shown providing an example approach that can be used in place of step 712. In this example, the amount of motor torque supplied/absorbed (and optionally the timing of motor torque adjustments) can be varied as the batter SOC varies. First, in step 810, the routine determines whether battery SOC is below a minimum threshold. If so, then the routine continues to maximize the energy recovery (absorb engine torque) in 812. Otherwise, in step 814, the routine determines whether battery SOC is greater than a maximum threshold. If so, then the routine continues to step 816 to expend energy during the VDE transition (supply motor torque). Otherwise, in step 818 the routine determines if the battery SOC is within a desired steady state operating conditions. If so, a neutral energy VDE transition mode is selected in step 820. Otherwise, a default response where the amount of torque supplies/absorbed is may be used to control the battery SOC to a desired value in step 822.

As will be appreciated that the routines described in FIGS. 7–8 and elsewhere herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages described herein, but are provided for ease of illustration and description. Although not explicitly illustrated, one of ordinary skill in the art will recognize that one or more of the illustrated steps or functions may be repeatedly performed depending on the particular strategy being used.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the valve operating patters, cylinder operating patterns, cylinder stroke variations, valve timing variations, and/or properties may be claimed through amendment of the present claims or through presentation of new claims in this or a related application. Such claims, whether broader, narrower, equal, or different in scope to the original claims, also are regarded as included within the subject matter of the present disclosure.

This concludes the description. The reading of it by those skilled in the art would bring to mind many alterations and modifications without departing from the spirit and the scope of the disclosure. For example, I3, I4, I5, V6, V8, V10, and V12 engines operating in diesel, natural gas, gasoline, or alternative fuel configurations could be used to advantage.

The invention claimed is:

1. A vehicle system, comprising:
   a engine provided for disabling and enabling at least one cylinder;
   a motor coupled to said engine provided for absorbing torque and providing torque;
   a controller for disabling and enabling said at least one cylinder, and during at least one of disabling and enabling, varying torque of said motor to compensate for transient changes in engine output torque caused by said one of disabling and enabling and selectively varying torque of said motor based on battery state of charge, wherein said controller further adjusts throttle position during at least one of disabling and enabling.

2. The system of claim 1 wherein varying torque of said motor farther comprises temporarily increasing motor torque output.

3. The system of claim 2 wherein varying torque of said motor further comprises temporarily increasing motor torque output immediately before said enabling or disabling.

4. The system of claim 2 wherein varying torque of said motor further comprises temporarily increasing motor torque output immediately after said enabling or disabling.

5. The system of claim 1 wherein varying torque of said motor further comprises temporarily decreasing motor torque output.

6. The system of claim 5 wherein varying torque of said motor further comprises temporarily decreasing motor torque output immediately before said enabling or disabling.

7. The system of claim 5 wherein varying torque of said motor further comprises temporarily decreasing motor torque output immediately after said enabling or disabling.

8. The system of claim 1 wherein varying torque of said motor further comprises temporarily increasing and temporarily decreasing motor torque output.

9. The system of claim 8 wherein an amount of increase and decrease is based on battery state of charge.

10. The system of claim 1 wherein said controller further adjusts throttle position immediately before one of disabling and enabling.

11. The system of claim 1 wherein said controller further adjusts throttle position immediately after one of disabling and enabling.

12. The system of claim 1 wherein said controller determines whether to increase or decrease motor torque depending on battery state of charge.

13. A vehicle system, comprising:
   a engine provided for disabling and enabling at least one cylinder,
   a motor coupled to said engine provided for absorbing torque and producing torque;
   a controller for disabling and enabling said at least one cylinder, and during at least one of disabling and enabling, varying torque of said motor to compensate for transient changes in engine output torque caused by said one of disabling and enabling, and varying whether said motor selectively produces or absorbs torque based on at least battery state of charge, where said motor produces torque when said battery state of charge has a first charge level, and where said motor absorbs torque when said battery state of charge has a second charge level, lower than the first charge level, wherein said controller further adjusts throttle position during at least one of disabling and enabling.

14. The system of claim 13 where said motor selectively produces or absorbs torque based further on at least motor torque capacity.

15. The system of claim 13 wherein said motor is provided for driving a vehicle without operation of the engine.

16. A computer storage medium having stored data representing instructions executable by a computer to control a vehicle system, the vehicle system comprising a engine provided for disabling and enabling at least one cylinder and a motor coupled to said engine provided for absorbing torque and producing torque, the medium comprising:
   code for disabling and enabling said at least one cylinder;
   code for assessing a battery state of charge;
   code for, during at least one of disabling and enabling, varying torque of said motor to compensate for transient changes in engine output torque caused by said one of disabling and enabling;
   code for adjusting throttle position during at least one of disabling and enabling; and
   code for varying whether said motor produces or absorbs torque based on at least battery state of charge.

17. The medium of claim 16 wherein absorbed torque generates energy stored in a battery.

18. A vehicle system, comprising:
   an engine that dynamically varies displacement by selectively enabling and disabling at least one of a plurality of cylinders, the engine being operatively linked to at least one of a plurality of drive wheels;
   a motor to exchange energy with at least one of the drive wheels by selectively absorbing energy from the drive wheel or providing energy to the drive wheel;
   a controller for assessing steady-state vehicle torque requirements and selecting a steady-state engine displacement and a steady-state motor condition, where the controller further predicts transient torque fluctuations anticipated to occur when engine displacement is varied and temporarily selects a transient motor condition, different than the steady-state motor condition, to smooth the predicted transient torque fluctuations.

19. The vehicle system of claim 18, where the steady-state motor condition includes providing energy and the transient motor condition includes absorbing energy.

20. The vehicle system of claim 18, where the steady-state motor condition includes providing energy at a first level and the transient motor condition includes providing energy at a second level, different than the first level.

21. The vehicle system of claim 18, where at least the transient motor condition is selected based on battery state of charge.

22. The vehicle system of claim 18, where the transient motor condition is selected to substantially cancel changes in manifold air pressure.

* * * * *